United States Patent
Sekido et al.

(10) Patent No.: US 7,081,218 B2
(45) Date of Patent: Jul. 25, 2006

(54) METHOD FOR PRODUCING UPSIZED FRP MEMBER

(75) Inventors: Toshihide Sekido, Otsu (JP); Akihiko Kitano, Matsuyama (JP); Eisuke Wadahara, Iyo-gun (JP); Fumiaki Noma, Matsuyama (JP)

(73) Assignee: Toray Industries, Inc. (JP)

( * ) Notice: Subject to any disclaimer, the term of this patent is extended or adjusted under 35 U.S.C. 154(b) by 249 days.

(21) Appl. No.: 10/398,147

(22) PCT Filed: Aug. 6, 2002

(86) PCT No.: PCT/JP02/08019

§ 371 (c)(1),
(2), (4) Date: Apr. 2, 2003

(87) PCT Pub. No.: WO03/013820

PCT Pub. Date: Feb. 20, 2003

(65) Prior Publication Data

US 2004/0130072 A1    Jul. 8, 2004

(30) Foreign Application Priority Data

Aug. 7, 2001  (JP) .............................. 2001-238854

(51) Int. Cl.
*B29C 39/42* (2006.01)
*B29C 39/44* (2006.01)
*B29C 70/44* (2006.01)

(52) U.S. Cl. ................. 264/40.1; 264/102; 264/128; 264/135; 264/136; 264/236; 264/257; 264/314; 264/316

(58) Field of Classification Search ............. 264/40.1, 264/102, 257, 258, 313, 314, 315, 316, 128, 264/134, 135, 136, 408, 236, 328.2, 328.8
See application file for complete search history.

(56) References Cited

U.S. PATENT DOCUMENTS

| 4,132,755 A | * | 1/1979 | Johnson ....................... 264/553 |
| 4,311,661 A | * | 1/1982 | Palmer ........................ 264/510 |
| 4,755,341 A | * | 7/1988 | Reavely et al. ............. 264/313 |

(Continued)

FOREIGN PATENT DOCUMENTS

JP    01-163028    *    6/1989

(Continued)

OTHER PUBLICATIONS

JP 2000043173 A Feb. 2000 Japan Abstract.*

(Continued)

*Primary Examiner*—Angela Ortiz
(74) *Attorney, Agent, or Firm*—DLA Piper Rudnick Gray Cary US LLP

(57) ABSTRACT

This invention relates to a method for manufacturing a large FRP member including: disposing a preform containing a reinforcing fiber on a surface of a molding die; covering a molding portion with a bagging material or a mold and providing a suction port and a resin injection port for sealing; evacuating the molding portion through the suction port; heating the molding portion; injecting a thermosetting resin from the resin injection port for impregnating the reinforcing fiber with the resin while a temperature Tm of the molding die and a temperature Tv of the bagging material or the mold are both set to room temperature or more, and a difference $\Delta T$ in temperature between the Tm and the Tv is set to 10° C. or less; and curing the resin by maintaining the molding portion at a predetermined temperature Tpc which is equal to or more than room temperature.

27 Claims, 5 Drawing Sheets

U.S. PATENT DOCUMENTS

| | | | | | |
|---|---|---|---|---|---|
| 4,942,013 | A | * | 7/1990 | Palmer et al. | 264/511 |
| 5,242,637 | A | * | 9/1993 | Inoue et al. | 264/45.3 |
| 5,588,392 | A | * | 12/1996 | Bailey | 114/357 |
| 6,406,580 | B1 | * | 6/2002 | Campbell, Jr. | 156/182 |
| 6,666,942 | B1 | * | 12/2003 | Campbell, Jr. | 156/182 |

FOREIGN PATENT DOCUMENTS

| | | | |
|---|---|---|---|
| JP | 04-144723 | * | 5/1992 |
| JP | 04144723 | * | 5/1992 |
| JP | 07100838 A | * | 4/1995 |
| JP | 07117137 A | * | 5/1995 |
| JP | 2000343538 A | * | 12/2000 |
| JP | 2001027678 A | * | 1/2001 |
| JP | 2001191351 A | * | 7/2001 |

OTHER PUBLICATIONS

European Search Report for PCT/JP02/08019.*

* cited by examiner

METHOD FOR PRODUCING UPSIZED FRP MEMBER

TECHNICAL FIELD

This invention relates to methods for manufacturing fiber reinforced plastics (hereinafter referred to as "FRP") having superior qualities with high productivity. In particular, the invention relates to a method for manufacturing a large FRP member, in which a FRP having superior qualities can be obtained at an inexpensive cost and with improved production yield, and non-impregnated portions or voids are unlikely to be formed.

BACKGROUND

Due to requirements, for example, for obtaining superior dynamic characteristics or saving weight, FRP, in particular, carbon fiber reinforced plastics (hereinafter referred to as "CFRP") have been used primarily for members used in the fields of the space and aircraft industry or sports industry. For example, the FRP described above have been used for members of the space and aircraft applications, which include primary structural materials (fuselages, main wings, tail units, wing ribs, and the like) and secondary structural materials (fairings, control surfaces, trailing edges, and the like) for small and medium airplanes, large passenger aircraft, military aircraft, space shuttles, and the like.

The previous technical subjects in the fields described above were primarily improvements of dynamic characteristics or higher accurate assembly of FRP; however, the recent subjects have been the production of larger FRP and the thorough production cost reduction thereof. As application fields of FRP mentioned above develop broadly to almost all transport facilities (railroad vehicles, automobiles, ships and vessels, and the like) and general industries (wind power, civil engineering, architecture, and the like), more cost reduction of FRP is required strongly.

As a typical method for manufacturing a FRP member having superior dynamic characteristics, an autoclave molding method has been known. In the autoclave molding method, prepregs composed of reinforcing fibers and a matrix resin impregnated therein beforehand are laminated to each other in a molding die and are then heated and pressed, thereby forming a FRP. When the prepregs are used in this method as an intermediate member, a FRP having significantly superior quality can be advantageously formed. However, in addition to high cost required for the formation and storage of the prepregs, since the molding equipment therefor becomes larger, the productivity of FRP according to this manufacturing method has not been so high.

As a manufacturing method of a FRP having superior productivity, for example, a vacuum resin transfer molding (vacuum RTM) method may be mentioned. According to the vacuum RTM method, reinforcing fibers not impregnated (dry) with a matrix resin are placed in a molding die having a complicated shape, and in the state in which the inside of the molding die is evacuated, the matrix resin is forcedly injected in the molding die with a pressure so that the fibers are impregnated with the matrix resin, thereby molding a FRP.

In this vacuum RTM method, in particular, when a large structural body is molded, since timing of injecting a resin from a plurality of resin injection ports, which are provided for the molding die, must be appropriately controlled, it is extremely important to understand the exact position of the flowing resin. In addition, when a large molded body which requires a plurality of injection ports as described above is formed, after a reinforcing fiber base material is placed in a bottom mold, the cavity thereof is covered with a transparent bagging film and is evacuated, and subsequently the resin is sequentially injected from the injection ports. In this case, while observing the flowing resin through the transparent bagging film, an operator optionally performs the injection of the resin at appropriate timing.

However, when the flow condition of the resin is observed by an operator as described above, some place may become difficult to be observed when a molded body is large, or the position of a front end of the flowing resin may be misunderstood in some case, and hence a problem may arise in that the injection of the resin cannot be performed at appropriate timing. Furthermore, when a molded body having high heat resistance is manufactured using the bottom mold and the bagging film described above, since the entire mold is heated to a high temperature, it becomes difficult for an operator to observe the flow of the resin by standing beside the mold, or when molding is performed by using a two-sided mold, the flow condition of the resin cannot be observed at all from outside the mold by an operator even when a molded body is relatively small. Accordingly, as a result, a problem may arise in that timing of injecting the resin from a plurality of injection ports cannot be determined. In the cases described above, while the flow velocity of the resin is being estimated, the timing of injecting the resin from a plurality of the injection ports has been determined by the intuition of an operator formed through experience and in consideration of the amount of the resin prepared beforehand. However, by the method described above, there have been problems in that the reliability is low, the probability of mass production is low, and the productivity is low.

SUMMARY OF THE INVENTION

Accordingly, this invention provides a method for manufacturing a large FRP member, which has superior mass production capability. A large FRP sheet member can be manufactured at an inexpensive cost without using expensive equipment and, by virtue of high molding efficiency, can be formed by molding in a relatively short molding cycle even in a small operation area, and non-impregnated portions, voids, and the like are not likely to be formed, thereby manufacturing a FRP having superior quality at an inexpensive cost and with high production yield.

In particular, when a resin is injected while a molding die and a reinforcing fiber base material are each maintained at an appropriate temperature, timing of injecting the resin from individual resin injection ports is not determined by the estimation of the flow condition of the resin based on visual observation by an operator or the intuition thereof formed through the experience, but the timing of injecting the resin from individual injection ports is appropriately determined by reliably understanding the position at which the resin in a liquid form flows; hence, a method for manufacturing a large FRP member is provided in which non-impregnated portions of the reinforcing fiber base material, voids, and the like are unlikely to be formed.

That is, the invention employs the following:

A method for manufacturing a large FRP member comprises the following steps (A) to (F), the setting step (A) of disposing a preform containing a reinforcing fiber base material on a surface of a molding die;

the sealing step (B) of covering a molding portion with a bagging material or a mold and providing at least one suction port and at least one resin injection port for sealing;

the evacuating step (C) of evacuating the molding portion through the suction port, the hot-air heating step (D) of heating the molding portion by hot air, the resin injection step (E) of injecting a thermosetting resin from the resin injection port for impregnating the reinforcing fiber base material with the resin under the conditions in which a temperature Tm of the molding die and a temperature Tv of the bagging material or the mold are both set to room temperature or more and a difference ΔT in temperature therebetween is set to 10° C. or less, and the curing step (F) of curing the resin by maintaining the molding portion at a predetermined temperature Tpc which is equal to or more than room temperature.

It is preferable that the preform comprise the reinforcing fiber base material and a resin distribution medium, that in the hot-air heating step (D), the molding die be disposed in a sealed chamber which is heat insulated with a heat insulating material and hot air be supplied and circulated, and that timing of starting the injection of the resin from a plurality of resin injection ports be controlled in accordance with signals supplied from resin detection sensors provided in the molding die.

It is more preferable that in the resin injection step (E), the temperature Tm of the molding die or the temperature Tv of the bagging material or the mold be in the range of from 50 to 160° C., that in the curing step (F), the predetermined temperature Tpc of the molding portion be in the range of from 80 to 180° C., that a viscosity ηp of the thermosetting resin at the temperature Tm of the molding die or the temperature Tv of the bagging material or the mold (hereinafter, the bagging material will be simply described; however, it does not mean that the bagging material is only specified), whichever is lower, be 500 mPa·s or less, and that a difference Δη between the viscosity at the temperature Tm and that at the temperature Tv be 200 mPa·s or less.

DESCRIPTION OF REFERENCE NUMERALS

Figure 1:
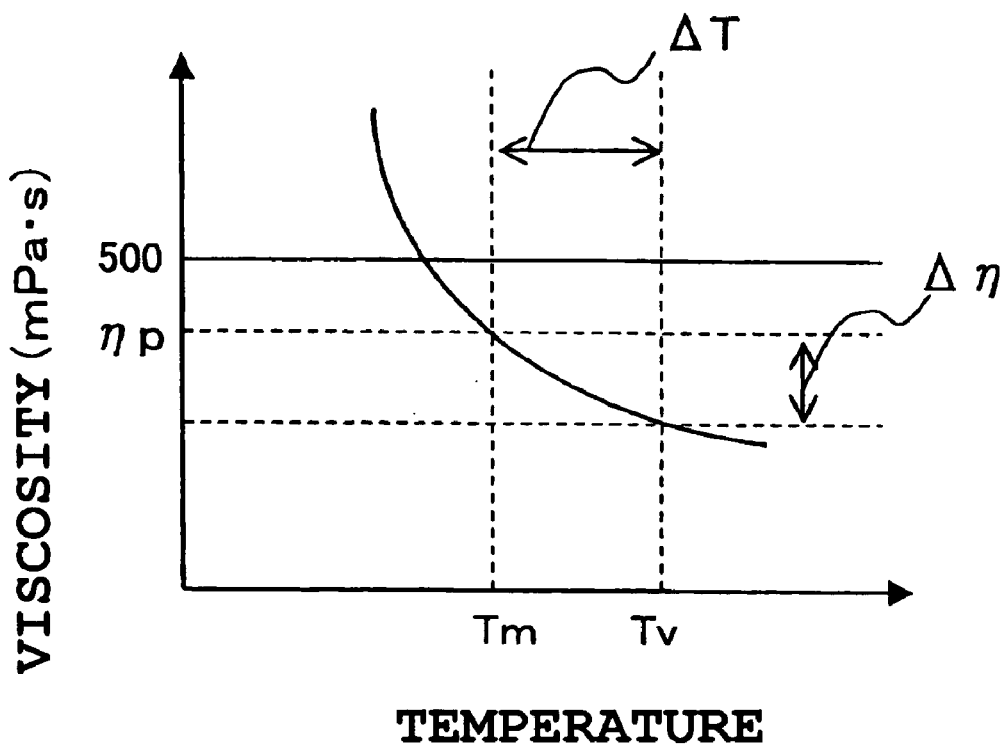
FIG. 1 is a schematic view showing the temperature dependence of a resin viscosity of one resin used in the present invention as an example.

Tm: temperature of molding die
Tv: temperature of bagging material or mold
ΔT: difference between temperatures of molding die and bagging material or mold
ηp: viscosity of resin at Tm or Tv, whichever is lower
Δη: difference between resin viscosities at Tm and Tv
1: molding die
2, 43: reinforcing fiber base material
3: bagging material
4: vacuum trap
5: vacuum pump
A1 to A4: resin injection line
B: vacuum suction line
C2 to C4: resin detection sensor
D1 to D5, F1 to F3: valve
G1 to G3: induction sensor
6: dielectric sensor
7: base substrate
8: comb circuit
11: reinforcing fiber base material
12: core material
13: groove
14a, 14b: thermo couple
15a, 15b: thermometer
16a, 16b: resin injection port
17: suction port
20: molding die
21: compression plate
22a, 22b: sealing adhesive tape
23: bagging material
24a, 24b: liquid resin
25a, 25b: resin injection tube
26a, 26b: valve
27: vacuum suction tube
28: vacuum trap
29: vacuum pump
31: mold base
32: heat insulating box
33: hot-air generator
34: exhaust port
40: mold
41: top mold
42: bottom mold
44: foam core
45: vacuum suction line and resin injection line
46: resin injection port
47: sealing O-ring
51: skin
52: stringer
53: flange
54: corner portion

DETAILED DESCRIPTION

When a large FRP member is molded, a molding portion may be evacuated through a plurality of suction ports, and a resin may be injected through a plurality of resin injection ports. Timing of starting the injection of the resin from the plurality of resin injection ports may be staggered, and hence the resin may be sequentially injected at time intervals. That is, the flow of the resin further from the resin injection port becomes increasingly slow nonlinearly because of increase in flow resistance. Accordingly, when a plurality of injection ports is provided, and the injection of a resin is newly performed, a molded body can be satisfactorily formed although having a large area and a long size. In addition, resin impregnation can be performed within a relatively short period of time, and voids formed in areas at which resin impregnation is not sufficiently performed are not generated, thereby being able to maintain good molding conditions. In addition, when a plurality of suction ports and a plurality of resin injection ports are appropriately provided, a molded body having a relatively complicated shape or structure, such as a skin structure in which ribs are locally provided, a skin structure in which opening portions (aperture portions) are formed in parts of the ribs, or a sandwich structure in which a skin structure is formed along the periphery of a sandwich structural portion, can be appropriately formed.

In order to solve the problems which occur when a resin is injected, the following method is performed. That is, a molding method is performed in which in accordance with signals supplied from resin detection sensors which is communicated with inside a molding die, timing of starting injection of the resin from the individual injection ports is controlled.

As the detection sensor for detecting a resin described above, when a detection sensor for liquid detection is used which is composed of a first optical fiber having a light-emitting surface, which emits light, at the front edge or at the vicinity thereof; and a second optical fiber having an incident surface, which receives light emitted from the first optical fiber, at the front edge or at the vicinity thereof, the resin can be detected although being a very small fraction thereof.

In addition, as the detection sensor for detecting a resin, when a detection sensor for liquid detection, which is composed of a flexible dielectric circuit substrate and which detects the change in dielectric constant, is used, a resin in plan view can be efficiently detected.

In addition, in the manufacturing method of a large FRP member, since the injected resin can be continuously evacuated until being gelled, the distribution of the resin can be reliably achieved, and voids caused by a remaining volatile gas generated from the resin can be prevented from being generated.

A resin distribution medium itself may be allowed to remain in a molded body and may be integrated therewith, or after molding, a sheet-shape resin distribution medium may be removed from a molded body. When the resin distribution medium is removed, a peel ply, which is an easy-removable release woven fabric, may be provided between the resin distribution medium and the reinforcing fiber base material.

In the manufacturing method of a large FRP member according to aspects of this invention, compared to conventional prepreg/autoclave molding, a one-sided mold may be used, the mold may be an inexpensive mold made of a nonmetal material or the like having a weak strength which can only withstand a vacuum pressure, expensive facilities such as autoclave equipment and a freezer for storing prepregs in a cold insulation state are not required, and hot air produced at an inexpensive cost can be used as a heating source. In addition, a reinforcing fiber base material, which is inexpensive as compared to prepregs, can be directly used, and the number of molding steps can be decreased. Furthermore, since the autoclave equipment and freezer for storing prepregs in a cold insulation state are not required, the space used for molding may be small, and operations from lay-up of the reinforcing fiber base material, resin injection, curing, and mold release can be carried out in the same place. Accordingly, in addition to significant decreases in production facility cost and production cost, a large FRP member can be molded in a relatively small area.

In addition, since a series of steps from molding to mold release can be carried out in the same place, and the molding die and the entire molding portion can be quickly heated to a predetermined temperature by using hot air, the molding cycle is shortened, and hence significantly high molding efficiency can be achieved. Accordingly, superior mass production capability can also be obtained.

In addition, the resin injection is performed by using a pressure difference (a maximum value of 98 kPa (1 kg/cm$^2$)) caused by a vacuum pressure; however, when the resin can be injected at a higher pressure, the injection thereof can be more efficiently performed. Hence, a resin bath is preferably disposed at a position higher than the surface of the molding die. Accordingly, a pressure in accordance with this hydrodynamic head difference is increased.

Hereinafter, the invention will be described in detail with reference to preferable embodiments.

The manufacturing method of a FRP includes at least the following steps (A) to (F).

Setting Step (A)

This step is a step of cutting a reinforcing fiber base material so as to have a predetermined size and shape for forming a preform, the preform being formed by lamination of a plurality of the cut base materials mentioned above whenever necessary, and placing the preform on the surface of the molding die.

In this step, the preform may be formed on the molding die and placed thereon, or the preform may be formed by using a perform mold different from the molding die and may then be move thereto for disposition.

In order to prevent the reinforcing fiber base material from being slipped or disordered, the preform may be fixed or densified in some cases. As fixing means, for example, there may be mentioned means for spraying adhesive particles onto parts or the entirety of the base material, the parts being in the form of spots or lines, followed by performing thermal adhesion, or means for disposing adhesive fibers followed by the same thermal adhesion as mentioned above. In addition, as densification means, for example, there may be mentioned means in which compression is performed using a press while heating, or means for evacuating a sealed space so that compression is performed at an atmospheric pressure.

In addition to the reinforcing fiber base material, the preform preferably contains a resin distribution medium since the impregnation of the resin is easily performed in the injection step (E) described below. As the resin distribution medium, for example, there may be mentioned a core material provided with predetermined grooves therein, or a net-shape sheet having low resin flow resistance. When the core material described above is used and is allowed to remain in a FRP after molding, a FRP having a sandwich structure can be obtained, and when the net-shape sheet described above is used and is removed after molding, a FRP having a skin structure can be obtained. In addition, in the latter case, since the resin distribution medium can be easily peeled off from the FRP after molding, a release woven fabric (peel ply) is preferably disposed between the resin distribution medium and the reinforcing fiber base material.

The core material described above preferably has a heat resistance in which the shrinkage is 5% or less when a vacuum pressure is applied at a heating temperature of 100° C. (preferably at a temperature of 120° C.). A porous and a solid material may both be used as the core material; however, it is important that the resin does not penetrate from the outer surface thereof, and when a foam material is used, the foam material preferably contains closed cells. In addition, depending on applications, a material having low humidity absorption (for example, a swelling rate of 5% or less after water absorption) may be required in some cases. As a particular material, for example, there may be mentioned a foam core made of polyvinyl chloride (for example, "Klegecell" (tradename)) or made of polymethacryl imide (for example, "Rohacell" (tradename)); or a honeycomb core made of aluminum or aramide filled with the foam core mentioned above. In addition, a wooden core or a balsa core may also be used.

In particular, when a FRP having a sandwich structure is formed, by disposing a compression plate (for example, a resin-made plate approximately 1 to 2 mm thick reinforced by a glass fiber base material) having a relatively high rigidity between the reinforcing fiber base material and a bagging material at a non-mold surface side, the smoothness can be fully obtained. A plurality of the compression plates may be disposed and joined to each other.

As the reinforcing fiber base material, for example, there may be mentioned a woven fabric, knitted fabric, or braided rope, having two-dimensional uni-, di-, or multi-directionality or three-dimensional multi-directionality; a sheet (unidirectional sheet) stretched in one direction; and a multi-directional sheet formed of at least two unidirectional sheets laminated to each other, and the materials mentioned above may be integrated together by using a stitch yarn or a knot yarn. In particular, for forming a structural material for transport facilities (particularly, aircrafts or automobiles), a unidirectional woven fabric or a unidirectional sheet is preferably selected.

As the reinforcing fibers, for example, glass fibers, organic (aramide, PBO (poly (paraphenylene benzobisoxazole)), PVA (polyvinyl alcohol), PE (polyethylene) or the like) fibers, or carbon fibers (PAN type, pitch type, or the like) may be used.

Since having superior specific strength and specific elastic modulus and absorbing substantially no water, carbon fibers are preferably used as reinforcing fibers for structural materials of aircrafts and automobiles. In particular, since impact absorption energy of a FRP is increased, the following highly tough carbon fibers are suitably applied to the structural materials of aircrafts. That is, the tensile modulus E (GPa), which is measured in accordance with JIS R7601, and the destructive stress energy W ($MJ/m^3=10^6 \times J/m^3$) are preferably 210 GPa or more and 40 $MJ/m^3$ or more, respectively. More preferably, the tensile modulus is more than 240 to less than 400 GPa, and the destructive stress energy is 50 $MJ/m^3$ or more. The destructive stress energy is the value obtained from the following equation ($W=\sigma^2/2E$) using the tensile strength $\sigma$ (GPa), measured in accordance with JIS R7601, and the above-mentioned E value.

In addition, in order to allow $\Delta T$ described later to meet the range, reinforcing fibers preferably have a high coefficient of thermal conductivity, and from this point of view, carbon fibers are desirably used. In this embodiment, the coefficient of thermal conductivity is preferably 10 W/(m·K) or more, more preferably 12 W/(m·K) or more, and even more preferably 20 W/(m·K) or more. The upper limit of the coefficient of thermal conductivity is not specified; however, since carbon fibers having excessively high coefficient of thermal conductivity may have poor mechanical properties in some cases, in general, the coefficient of thermal conductivity is preferably 100 W/(m·K) or less.

Furthermore, in the manufacturing method of a large FRP member, it is preferable that reinforcing fibers having a high coefficient of thermal conductivity be selectively disposed in a major direction of the FRP member since the $\Delta T$ can be set in the range within a short period of time, and as a result, molding can be performed in the state in which the temperature is stabilized.

Sealing Step (B)

After the preform together with, when necessary, auxiliary materials such as a resin distribution medium or a release woven fabric are disposed on the surface of the molding die, for example, a sealing adhesive tape or sealant is adhered to the surface of the molding die around the periphery of the preform, and the bagging material such as a bagging film is disposed thereon to cover the molding portion on the molding die for sealing. In addition, in order to further increase a volume ratio of the reinforcing fiber base material, the bagging film thus provided may be further covered with another bagging film for preventing an increase in pressure inside the bag after the resin is injected. Alternatively, while being bagged and heated, the molding portion is held for an appropriate period of time so as to be compressed by an atmospheric pressure. In addition, in order to enhance economical efficiency, a rubber sheet made of silicone rubber, which is reusable, may be used as the bagging material. In addition, a rubber sheet incorporating a heater therein may serve effectively for heating and heat insulation in some cases.

When sealing is performed, reduced-pressure (vacuum) suction ports and resin injection ports are provided. In more particular, linear devices (for example, aluminum-made C-shaped channel materials) provided with opening portions are disposed at the peripheries of the ends of the reinforcing fiber base material, and for example, resin-made tubes are communicated with the end portions of the linear devices.

Evacuating Step (C)

The molding portion is evacuated by using an oil diffusion type vacuum pump or the like through the suction portions. By this evacuation, air which may generate voids is preferably removed as much as possible. In addition, a reinforcing fiber volume ratio Vpf of the reinforcing fiber base material is preferably increased by pressing the base material using an atmospheric pressure, and the fiber volume ratio Vpf is preferably set to 45% or more and more preferably set to 50% or more. In the case described above, when the temperature is increased to a temperature or more at which the adhesive particles or the adhesive fibers are thermally adhered in the heating step (D) described later and is retained for a predetermined period of time, the Vpf can be more reliably increased.

Hot-Air Heating Step (D)

The molding portion including the molding die is heated. In this heating, as a heating medium, hot air, whose facility and running cost are relatively inexpensive, is used. That is, as a heating source for heating the entire molding die, hot air is preferably used which can achieve a high heating efficiency by performing the following method. That is, a method in which a heating oven receives the entire molding die and is then sealed, and hot air is subsequently circulated in the oven has a high heat efficiency and is most favorable in practice, and in addition, a method may be used in which a simple sealed chamber is formed, the entire molding die is covered with insulating materials, and hot air is supplied therein and circulated by a blower. In both cases, when hot air is used as a heating medium, the temperature of the molding die can be easily controlled at an inexpensive cost within the range of ±5° C. or less (preferably ±2° C. or less) with respect to the predetermined temperature Tm described later. By hot-air heating, compared to the autoclave, a high economical efficiency can be achieved. However, when an autoclave that has been already installed can be used as it is, the autoclave, which has uniform temperature control capability, may be used.

Resin Injection Step (E)

When the temperature Tm of the molding die and a temperature Tv of the bagging material are both room temperature or more, and the difference ΔT in temperature between the Tm and the Tv is 10° C. or less (preferably 8° C. or less, more preferably 5° C. or less, and even more preferably 3° C. or less), for example, while reduced-pressure (vacuum) suction is continued, an end of a tube communicated with the resin injection port is inserted into a liquid resin received in a container, which resin is preferably defoamed beforehand, thereby injecting the resin into the molding portion of the molding die in which the reinforcing fiber base material is disposed. In some cases, a mechanical pressure equal to or more than an atmospheric pressure may be applied for forcedly performing the injection.

When the Tm and Tv are in the range of from 50 to 160° C., since the resin described below has a low viscosity, impregnation of the resin preferably becomes easier, and in addition, since the range of selection for the resin itself becomes wider, a high-performance resin having, for example, superior dynamic characteristics can be preferably selected and used.

The ΔT will be described in detail with reference to the figure. FIG. 1 is a schematic view showing the temperature dependence of a resin viscosity of one resin used in the present invention as an example. When the ΔT exceeds 10° C., the difference in resin viscosity between at the surface of the bagging material and at the surface of the molding die becomes too large, a significant difference in flow behavior of the resin is generated, the flow balance is destroyed, and in the worst case, problems may arise, for example, in that non-impregnated portions may remain in the preform. As a result, a high performance FRP cannot be stably obtained with good productivity. In particular, when a FRP having a sandwich structure is formed using a core material as a resin distribution medium, since the core material generally has a coefficient of thermal conductivity lower than that of the reinforcing fiber base material in many cases, thermal conduction between the molding die and the bagging material is interfered with, the difference in temperature in the reinforcing fiber base material is considerably increased, and as a result, the phenomena described above become more serious.

In particular, the generation of the ΔT will be described. For example, when heating is performed by hot air, part of the reinforcing fiber base material, which is disposed at the bagging material side, is heated therethrough, and part of the reinforcing fiber base material, which is disposed at the molding die side, is heated therethrough as is the case described above. However, due to considerable differences in coefficient of thermal conductivity and thermal capacity between the molding die and the bagging material because of the difference in thickness and material therebetween, and due to the circulation path of the hot air described above, when heating is started at the same time, the time required for reaching a predetermined temperature for the molding die is unexpectedly different from that for the bagging material. In general, the bagging material has a small thermal capacity, the part of the reinforcing fiber base material at the bagging material side faster reaches the predetermined temperature, and as a result, the ΔT is generated. Of course, depending on the hot-air circulation path, the temperature of the part of the reinforcing fiber base material at the molding die side may faster reach the predetermined temperature in some cases.

In addition, since the ΔT is also strongly influenced by the coefficient of thermal conductivity of the preform (laminated reinforcing fiber base material) itself, in particular, when the ΔT is set in the range within a short period of time, the reinforcing fiber volume ratio Vpf of the reinforcing fiber base material in the preform is preferably set to high (dense). When the Vpf is increased by only 20%, since the thermal conductivity can be easily increased from 10 W/(m·K) to the desired state having a thermal conductivity of 12 W/(m·K), the effect of the increase of Vpf is significant. However, when the Vpf is too high, the impregnation of the resin may be interfered with in some cases. Form the points described above, the Vpf is preferably set to 45 to 62%, and more preferably set to 50 to 58%. In this embodiment, the Vpf can be calculated by the following equation.

$Vpf=(W1 \times P1)/(\rho \times t1 \times 10)$

W1: weight of reinforcing fibers per 1 m² of reinforcing fiber base material (g/m²)

P1: the number of reinforcing fiber base materials laminated to each other in preform ρ: density of reinforcing fibers (g/cm³)

t1: thickness of part at which the reinforcing fiber base materials laminated to each other in preform (mm)

That is, it was discovered that the actual temperature Tm of the molding die and the actual temperature Tv of the bagging material have a relatively large temperature difference therebetween because of the difference in heat conduction path during heating, and that due to this difference, a high quality FRP cannot be stably obtained with good productivity, and in the present invention, the problems described above can be solved by the method described above.

The measurement of the Tm may be performed by measuring the temperature in the molding die using, for example, a thermo couple. In particular, when the molding die is a FRP-made die or a wooden die, having a poor coefficient of thermal conductivity, in order to more precisely reflect the temperature of the reinforcing fiber base material, the measurement point in the molding portion is preferably at a distance of 5 mm or less from the surface of the molding die, and more preferably, the measurement is performed on the surface of the molding die.

In addition, the temperature Tv of the bagging material may be performed by measuring the surface temperature of the bagging material at the molding portion using, for example, a thermo couple. Since the thickness of the bagging material is very thin as compared to that of the molding die, even when the coefficient of thermal conductivity is low, the external surface temperature of the bagging material indicates a relatively precise temperature of the reinforcing fiber base material. Of course, in order to more precisely detect the temperature of the reinforcing fiber base material, the surface temperature of the internal surface of the bagging material at the molding portion is preferably measured.

When the measurement of the Tm and the Tv described above is performed in the thickness direction, it is preferable since the flow behavior of the resin can be more precisely expected. In this case, when the measurement is performed at a plurality of positions, and the ΔT at each position is set in the range described above, this case is one of the most preferable embodiments since the flow behavior of the resin can be further precisely expected.

In addition, from a different point of view, it is preferable that the resin viscosity ηp at the Tm or the Tv, whichever is lower, be 500 mPa·s or less, and that the difference Δη in resin viscosity between at the Tm and the Tv be 200 mPa·s or less. The resin viscosity ηp is more preferably 350 mPa·s or less and even more preferably 200 mPa·s or less, and the viscosity difference Δη is more preferably 150 mPa·s or less and even more preferably 100 mPa·s or less. The reasons the ranges described above are preferable are the same as those for the temperature difference ΔT described above. The resin viscosity is a viscosity measured at a constant shear speed using an E type viscometer (TVE30H, manufactured by TOKIMEC).

In particular, the resin distribution medium is preferably used. The reason for this is that while the resin injected in the cavity flows and diffuses in groves formed in the core material in the case of a sandwich structure or flows and diffuses in the resin distribution medium along the surface thereof in the case of a skin structure, the resin penetrates the resin distribution medium in the thickness direction thereof and subsequently impregnates the reinforcing fiber base material, and hence impregnation of the resin can be efficiently and quickly performed. After the impregnation in the reinforcing fiber base material is complete, the resin then flows to the vacuum suction ports.

Since this effective and quick impregnation of the resin can be performed, the manufacturing method of the invention is suitably used for manufacturing a large FRP having a size of 3 m or more. As for a FRP having a size of 5 m or more to 10 m or more, the merit can be further obtained. When the large FRP described above is formed, the injection speed of the resin is decreased to a level lower than a predetermined level, and in order to prevent the resin from being gelled before the impregnation of the entire resin is complete, a plurality of resin injection lines is provided in many cases. In addition, as is the case described above, a plurality of vacuum suction lines maybe provided in some cases. In the case described above, timing of injecting the resin in the individual resin injection lines must not be always predetermined or simultaneous, and the timing is preferably determined by observing or monitoring the flow of the resin so as not to generate non-impregnated portions. When the bagging material is transparent or translucent, the flow of the resin can be observed, and even in the case in which the observation cannot be visually performed, by the resin detection sensor described later, which uses light or a dielectric constant, the flow of the resin can be understood.

In order to suppress the formation of defects, such as non-impregnated portions or voids, as much as possible, the reduced-pressure (vacuum) suction is preferably continued until the resin injected is gelled.

A thermosetting resin having superior heat resistance is preferably selected, and in particular, after being heated, a resin having a glass transition temperature Tg of 100° C. or more, preferably 120° C. or more, and more preferably 150° C. or more is preferably selected. In more particular, a resin is preferably selected which is liquid when injected in the resin injection step (E) and has a Tg of 100° C. or more after being heated and cured in the curing step (F). In consideration of the impact resistance and fatigue properties, the elongation rate of the resin is preferably 3% or more at room temperature, and more preferably 4.5% or more. As the resin described above, for example, epoxies, phenolics (resol type), polybenzimidazoles, benzoxazines, cyanate esters, unsaturated polyesters, vinyl esters, urea-melamines, bismaleimides, polyimides, polyamide imides, copolymers and modified resins thereof, resins formed by blending at least two types of resins mentioned above, and resins containing an elastomer or rubber component, a curing agent, a curing promoter, a catalyst, or the like may be used. Some of the thermosetting resins mentioned above may be separated into a base resin and a curing agent, and in this case, those mentioned above are preferably mixed with each other, stirred, and defoamed by evacuation just before the injection is performed. When being defoamed, heating may be performed in some cases for easy defoaming.

<Molding Method by Resin Detection Sensor>

Figure 2:
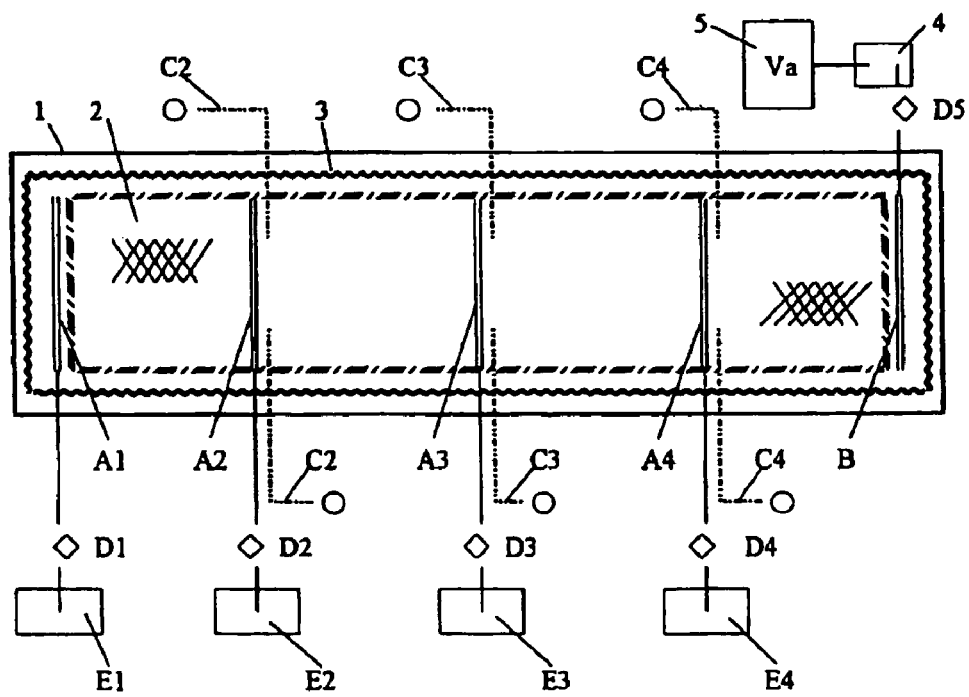
FIG. 2 is a schematic structural view showing a molding method according to one embodiment and example 2 of the invention.

Hereinafter, referring to the figures, a molding method by using a resin detection sensor will be described in detail together with a preferable embodiment. FIG. 2 is a view showing a manufacturing method of a large FRP member of one embodiment according to the present invention. This is a plan view when the molding die is viewed from the above. On a molding surface of a molding die 1, a reinforcing fiber base material 2 is disposed, and a plurality of the resin injection lines is disposed at regular intervals. At one end of the base material opposite to that at which a first resin injection line A1 is provided, a vacuum suction line B is disposed, and the entire base material 2 including the resin injection lines and the vacuum suction line is covered with a bagging material 3. Resin detection sensors C detecting the flow of the resin are disposed on the upper surface of the base material at the front ends of resin injection lines except the first resin injection line A1.

In order to increase the fluidity of the resin, a resin distribution medium having a resin flow resistance of one tenth or less of that of the reinforcing fiber base material is provided together with the resin detection sensors C on the base material with a release woven fabric provided therebetween (the resin distribution medium and the release woven fabric are not shown). Subsequently, the bagging material 3 is provided thereon so as to bag the entirety. Sealing between the bagging material 3 and the molding die 1 is performed by a double-sided sealing adhesive tape (not shown). This double-sided sealing tape is also used for sealing between the molding die 1 and the tubes and the like, which communicate the resin injection line A1 and the vacuum suction line B and which extend outside the bagging material 3, and electric wires and the like of the resin detection sensors C.

After the various materials are disposed on the molding die as described above, and the entirety is bagged with the bagging material 3, the entirety inside the bag is evacuated by a vacuum pump 5 through a vacuum trap 4 communicating the vacuum line B. In this step, of course, all valves (D1 to D4) provided for the tubes communicated with the resin injection lines are closed.

Subsequently, hot air for heating is generated by an oven (not shown), and the entire molding die is heated to a predetermined temperature. The individual surface temperatures are clearly detected by thermometers (not shown) disposed on the surface of the die and the surface of the base material. When the temperatures reach predetermined temperatures, a first valve D1 is first opened, thereby injecting a predetermined resin into the first resin injection line A1 from a resin container E1. The resin flowing out from the first resin injection line A1 then flows in the resin distribution medium toward the vacuum suction line B disposed at the position opposite to the first resin injection line A1. The resin flowing in the resin distribution medium at the surface of the base material will flow therein for impregnation. However, although flowing toward a second resin injection line A2, since the resin flows in the resin distribution medium and the base material which are already impregnated, the resin flow resistance is gradually increased, and as a result, the flow velocity is nonlinearly decreased.

Before a pot lifetime of the resin passes, in this embodiment, new resin injection must be started from the second resin injection line A2 so that the resin flows through portions at which the resin flow resistance is not increased yet and does not flow through the portions which are already impregnated with the resin. In order to precisely control the timing of opening a valve D2 for injecting the resin in the second resin injection line A2, a time when the resin flows through a predetermined position is precisely detected by a resin detection sensor C2. By this sensor C2, when the timing of injecting the resin in the second resin injection line A2 is recognized, the second valve D2 is opened, thereby injecting a new resin from the position thereof. The injection of the resin from the first resin injection line A1 is stopped by closing the valve D1. The resin injected from the second resin injection line A2 flows toward a third resin injection line A3. Subsequently, the steps described above are repeated. When the resin finally reaches the vacuum suction line B, the resin flowing in the final resin injection line is stopped by closing a valve thereof.

Curing Step (F)

After the impregnation is completed, it is preferable that the injection of the resin be stopped and that the resin injection ports be completely closed so that air is not allowed to flow in the resin injection ports. In the state described above, the molding portion including the molding die is maintained at a predetermined temperature Tpc equal to or more than room temperature for a predetermined time, thereby curing (hardening or polymerizing) the resin thus impregnated. When the Tpc mentioned above is in the range of from 80 to 180° C., the curing of the resin can be efficiently promoted, and it is preferable since the molding cycle can be shortened.

As a heating medium, hot air heating the entire molding die is preferably used. The reasons the hot air is preferable are the same as those described in the heating step (D).

In the FRP obtained in this step, a reinforcing fiber volume ratio Vf of the reinforcing fiber base material in the FRP is preferably set to 45 to 65%, more preferably 50 to 62%, and even more preferably 53 to 60%. When the Vf is less than 45%, the effect of saving weight becomes poor, and in addition, the dynamic characteristics tend to be inferior on the whole. This means that it becomes difficult for the FRP mentioned above to be applied, in particular, to members of aircrafts. In addition, when the Vf is more than 65%, the dynamic characteristics (particularly, compression strength) become inferior, and in addition, non-impregnated portions may be formed in some cases. The Vf may be set in the range described above. The Vf can be obtained by the following equation.

$$Vf=(W2\times P2)/(\rho \times t2 \times 10)$$

W2: weight of reinforcing fibers per 1 m² of reinforcing fiber base material (g/m²)

P2: the number of reinforcing fiber base materials laminated to each other in FRP $\rho$: density of reinforcing fibers (g/cm³)

t2: thickness of part at which the reinforcing fiber base materials laminated to each other in FRP (mm)

In addition, the manufacturing method of a large FRP member of the present invention may further comprise the following steps after the curing step (F), whenever necessary.

Recovering Step (G)

After the resin is cured, it is confirmed that the resin has rigidity so as not to be deformed when released from the mold, the bagging film and rubber sheet are removed, and a FRP molded body is demolded and recovered from the molding die. The resin distribution medium, in particular in the case of the core material, may be allowed to remain in the molded body as it is, and whenever necessary, the resin distribution medium, in particular in the case of the net-shape sheet, may be removed from the FRP molded body. In the latter case, when a peel ply (having poor compatibility with a resin to be used, for example, a polyester-made woven fabric when an epoxy resin is used as the resin) is provided between the reinforcing fiber base material and the resin distribution medium, peeling and removing can be easily performed.

Full Curing Step (H)

The FRP molded body thus recovered is further maintained at a temperature Tac, which is higher than the temperature Tpc and is 100° C. or more, so as to be fully cured (hardened or polymerized). By the step described above, the glass transition temperature Tg can be further increased by fully curing the resin, and it is preferable since the FRP can be applied, for example, to members of aircrafts which require high heat resistance.

Since the FRP obtained by the manufacturing method of a large FRP member has superior dynamic characteristics and is light weight in addition to the superior quality, as the preferable applications thereof, for example, there may be mentioned structural members, external members, internal members for transport facilities such as aircrafts, automobiles, and ships and vessels, or components of the members mentioned above. In particular, the FRP molded body is preferably used for manufacturing the structural members of aircraft, for example, in addition to the second structural materials such as various fairing, main landing gear doors, tail corns, engine nacelles, and control surfaces, the primary structural materials such as main wings, floor-supporting beams, fuselages, vertical tails, horizontal tails, wing boxes, and keels.

<Manufacturing Method of Skin-Stringer Structure>

Figure 7:
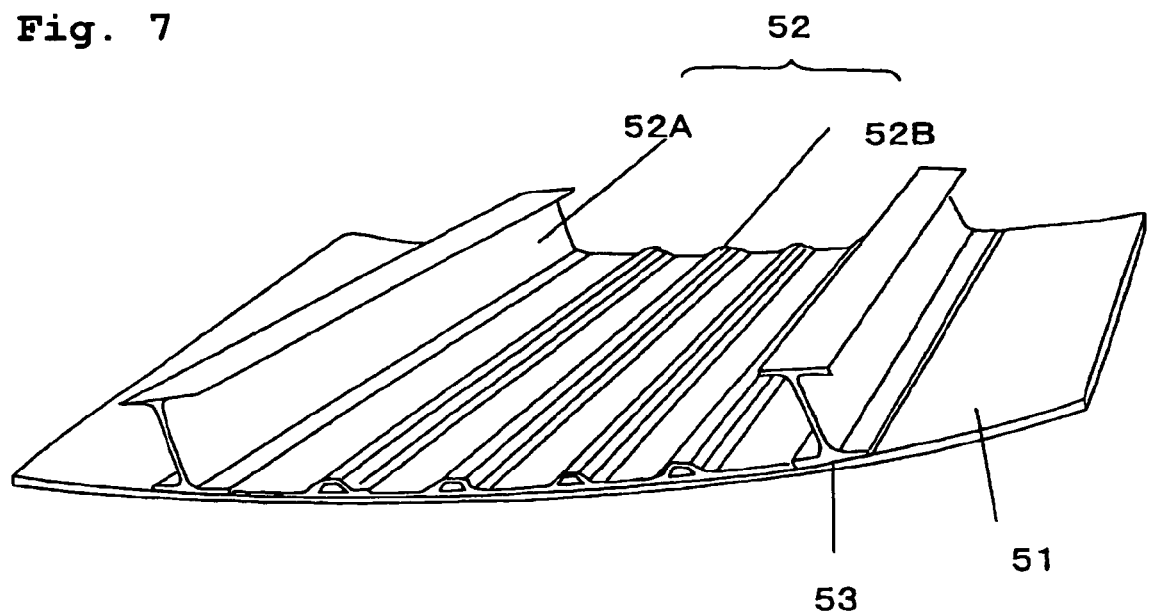
FIG. 7 is a perspective view of one embodiment of a CFRP-made skin-stringer structural member formed by a manufacturing method of the invention.

The "skin-stringer structure" is the structure in which a skin (plate) 51 and a stringer 52, which is a reinforcing material used as a beam or frame, are integrally provided on at least one side of the skin 51, as shown in FIG. 7. In this case, the stringer 52 maybe a relatively large member 52A having an I shape shown in the figure or may be a small rib member 52B. When those members 51 and 52 are integrated with each other, the weight of a joint portion can be reduced, and as a result, considerable weight reduction can be achieved as compared to the weight of metal. In addition to that, since assembly jigs and works for forming the joint portions are not required, it is significantly preferably in economical point of view. In addition, since the joint portions are not present in this structure, the effect of reducing aerodynamic resistance and the effect of suppressing degradation caused by intrusion of moisture from the joint portions can also be expected. The size of the structural member obtained by the manufacturing method is 3 m² or more in plan view, and the major applications thereof are not specifically limited; however, for example, part or the entirety of a fuselage, main wing, tail unit, bulk head, floor, and canard of an aircraft may be formed of the structural member described above.

The skin 51 may have a flat surface or irregular surface; however, since the surface rigidity is essential, the skin preferably has in-plane isotopic properties, and it is preferable that the orientation directions of the fibers described later orthogonally intersect each other (hereinafter referred to as orthogonal structure or 0/90 structure), intersect each other in the directions which form an angle of 45° (hereinafter referred to as quasisotropic structure), or intersect each other in the directions which form an angle of 60° (hereinafter referred to as triaxial structure or quasisotropic structure). When a fuselage portion corresponds to the skin, since the tensile stress is generated in the circumferential direction of the fuselage by an internal pressure, a larger amount of reinforcing fibers is preferably oriented in the circumferential direction within the range which is not considerably deviated from the quasisotropic structure described above, and as the particular range, a ratio in the range of from 25% to 35% of the reinforcing fibers is preferable. In the case described above, when the ratio is less than 25%, the strength in the circumferential direction becomes insufficient, and when the ratio exceeds 35%, the strength other than the circumferential direction tends to decrease. In addition, in the case of a part of the fuselage skin, which is located at the top (hereinafter referred to as "crown position"), in order to improve the flexural rigidity and strength in the direction between the front and the back of the aircraft, a larger amount of continuous fibers is preferably aligned in the longitudinal direction, and in more detail, a ratio in the range of from 25% to 40% of the reinforcing fibers is preferable.

At the upper surface of skins of the wing and canard, since a compression stress caused by a lifting power is applied to the longitudinal direction of the wing, continuous fibers are preferably aligned in the longitudinal direction of the wing. In this case, when the fibers aligned in the longitudinal direction are disposed closer to the topmost upper surface of the skin, it is preferable since the flexural rigidity is increased; however, since the probability of receiving an impact such as a drop of a tool is also increased, the fibers are preferably disposed slightly inside (inner side from the topmost surface at which the fibers are aligned so as to form 45° with the longitudinal direction of the main wing) from the topmost surface.

Skins for the floor or bulk head are supported by stringers from two sides in many cases, and in order to reduce the warpage of the skin, continuous fibers are preferably aligned at every 45° or at every 60° to form the quasisotropic structure.

Figure 8:
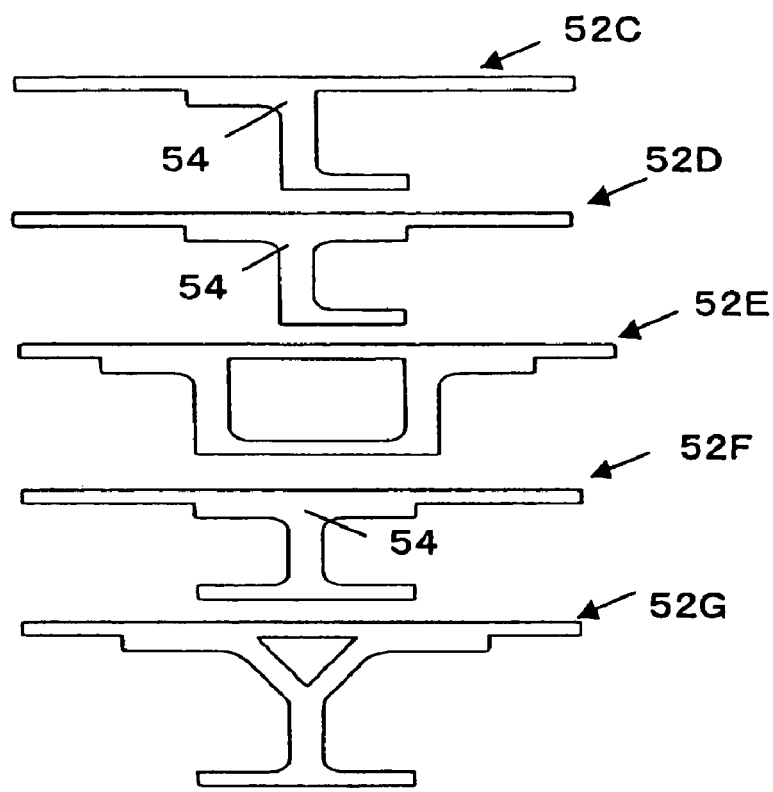
FIG. 8 includes cross-sectional views of various embodiments of the stringers shown in FIG. 7.
Figure 9:
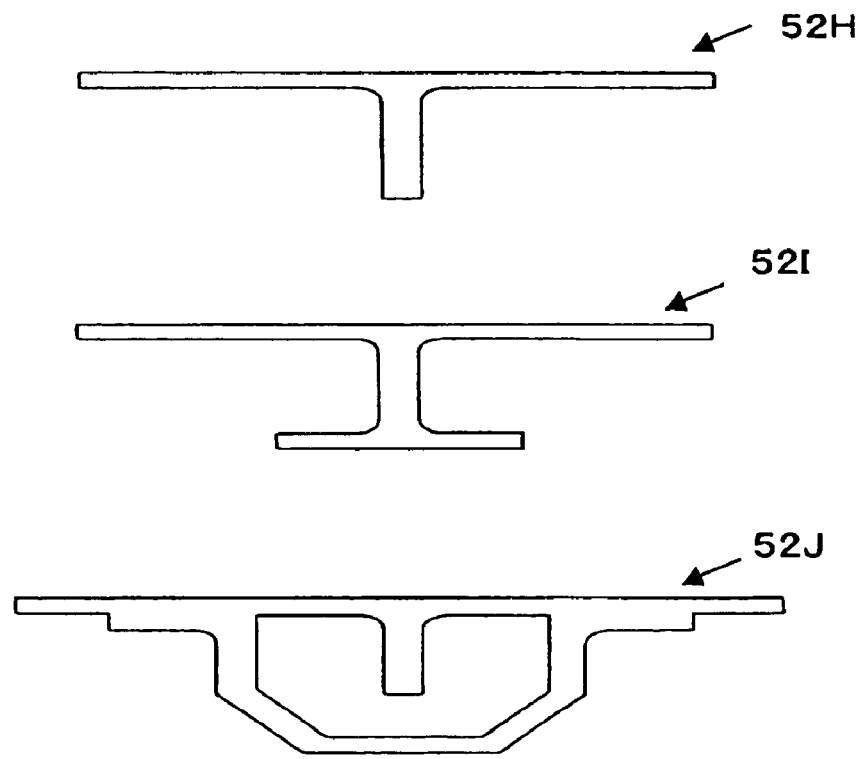
FIG. 9 includes cross-sectional views of stringers having structures different from those of the stringers shown in FIG. 8.

The stringer portion is formed so as to improve the rigidity of the skin in the intended directions. That is, in the case of the fuselage, the stingers are integrally formed with the skin in the circumferential direction and the longitudinal direction. In the case of the wing, the stringers are provided in the longitudinal direction, and ribs are provided in the direction orthogonal thereto. As shown in FIGS. 8 and 9, there are various cross-sections of the stringers 52, for example, an I type, Z type, L type, T type, J type, Y type, hat type, or a box type stringer 52C to 52J. In addition, as shown in FIG. 7, a flange portion 53 may have a curvature along the curved surface of the skin, or the cross-section area thereof may also vary. Since the rigidity and torsional rigidity in the longitudinal direction are important for the stringer, a larger amount of continuous fibers is aligned in the longitudinal direction. As a preferable range of the continuous fibers which are aligned, the ratio is in the range of from 25% to 60% of the reinforcing fibers. In addition, a larger amount of the continuous fibers is preferably aligned in the direction forming an angle of 40 to 50° with the longitudinal direction, and as a preferable range of the fibers which are aligned, the ratio is preferably in the range of from 25% to 50% of the reinforcing fibers. In addition, as shown in FIG. 8, for example, at the corner portion 54 of the Z cross-sectional stringer 52C, since peeling may occur at the curved portion of the stringer due to the generation of an out-of-plane force, reinforcement is preferably performed for the curved portion by stitch using reinforcing fibers or pins in the thickness direction. In particular, when the thickness of the stringer exceeds 3 mm, the reinforcement in the thickness direction is effective. Of course, the reinforcement of the flange portion may also be performed by stitch or the like as is described above.

These large primary structural members are required to have significantly superior reliability, are required to have the damage resistances described above (although receiving a certain large internal damage, the structural member has a remaining compression strength which is sufficient to continue the flight), and in addition, are required to have heat resistance. Among those described above, since a fuselage keel portion (the bottom portion of the fuselage) is subject to collision with stones, and the upper and lower surfaces of the main wing are subject to impacts of tools or the like, aspects of this invention are preferably applied thereto. When the size of the member is increased, for example, by integrating components, it is preferable in economical point of view since the number of components and the number of assembly steps can be decreased; however, when the size is too large, problems may arise in that it becomes difficult to secure access holes, non-destructive inspection cannot be easily performed, and the like. Accordingly, the appropriate upper limit may be approximately 100 m$^2$.

In order to efficiently obtain various desired components and the like from the member, the maximum longitudinal length of the member is preferably 30 m or less. The maximum longitudinal length is the maximum length among the lengths between two points, which are optionally selected, on the member.

In the manufacturing method of a CFRP-made skin-stringer structure member, according to aspects of this invention, compared to the molding by a traditional prepreg/autoclave method, a one-sided mold may be used, and as long as withstanding a vacuum pressure, the mold may be an inexpensive mold made of a nonmetal or the like having a weak strength. In addition, expensive facilities such as autoclave equipment and a freezer for storing prepregs in a cold insulation state are not required, and hot air produced at an inexpensive cost can be used as a heating source. In addition, compared to prepregs, an inexpensive reinforcing fiber fabric can be used, and the number of steps of molding can be decreased. Furthermore, since the autoclave equipment, freezer for storing prepregs, and the like are not necessary, the space used for molding can be small, and steps from lay-up of the reinforcing fiber fabric, resin injection, curing, to mold release can be carried out in the same place. Accordingly, the production facility cost and the production cost can be significantly reduced, and in addition, primary structural members of aircraft having a skin-stringer structure can be easily manufactured at an inexpensive cost.

EXAMPLES

Hereinafter, more particular examples will be described. Concerning molding conditions and structural specification of molding device, the following examples and comparative example were carried out.

Example 1

(1) Structure: the entirety having substantially a sandwich structure, a planar plate having a length of approximately 5 m and a width of approximately 3 m, the end portion 100 mm wide along the entire periphery of the plate having a skin structure (assuming a secondary structural member of aircrafts, such as a fairing)

(2) Structure of a reinforcing fiber base material:

(2-1) Flat surface portions of the sandwich structure (both top and bottom surfaces);

"Torayca" bidirectional woven fabric (200 g/m²×6 plies), manufactured by Toray Industries, Inc.

(2-2) Web portion of the sandwich structure;

"Torayca" bidirectional woven fabric (200 g/m²×8 plies), manufactured by Toray Industries, Inc.

(2-3) Skin structure portion of the periphery end portion;

"Torayca" bidirectional woven fabric (300 g/m²×10 plies), manufactured by Toray Industries, Inc.

(3) Core material: a polymethacryl imide-made foam core (Rohacell); an expansion ratio of 15 times×25 mm in thickness, rectangular grooves (3 mm×3 mm, 25 mm in pitch) in the width direction for resin flow provided in the top and bottom surfaces of the core in a stagger manner.

(4) Molding die: a CFRP-made mold 10 mm thick composed of carbon fibers and an epoxy resin was used, and a mold base was a frame structure made of angle bars.

The planar plate was formed by the following method, the planar plate having a CFRP sandwich structure 5 m or more in length and 3 m or more in width, the end portion of the planar plate being formed a CFRP skin layer 100 mm wide along the periphery thereof.

Figure 3:
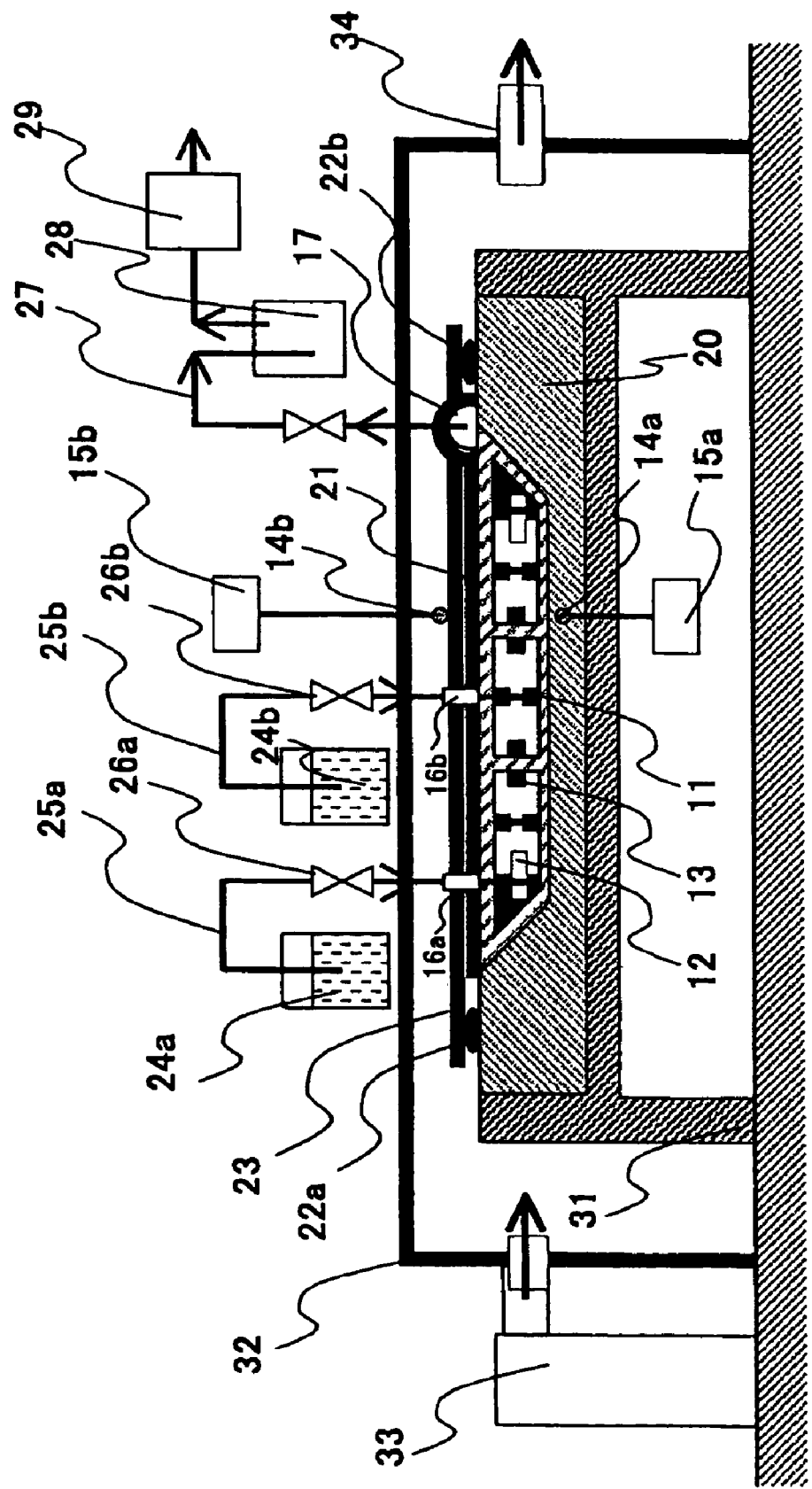
FIG. 3 is a schematic, lateral cross-sectional view of a molding device showing a manufacturing method of a large FRP member according to example 1 of the invention.

(a) After the reinforcing fiber base materials were cut to have a predetermined size and shape and were then laminated to each other so as to form the structure described above, adhesive particles (a thermosetting resin and a curing agent were mixed together and then formed into a powder) applied beforehand to the reinforcing fiber base materials at positions where shape stability was particularly important were heated and melted, thereby tightly bonding the laminated reinforcing fiber base materials to each other. Two laminates of the reinforcing fiber base materials thus bonded were prepared. On the surface of the molding die described above, the laminates of the reinforcing fiber base materials were disposed as shown in FIG. 3 which is a vertical cross-sectional view perpendicular to the longitudinal direction, that is, a reinforcing fiber base material 11, a core material 12, and the base material 11 described above were disposed in that order. Next, a compression plate 21 (1.5 mm thick) made of glass fiber reinforced plastics was disposed on the top base material 11, and resin injection ports 16a and 16b, and suction port 17 were then formed.

(b) Subsequently, the entire molding portion of a molding die 20 was covered with a bagging material 23, and the periphery was sealed using sealing adhesive tapes 22a and 22b. The reinforcing fiber volume ratio Vpf of the reinforcing fiber base material portion of the skin structure portion in the preform was 48% in this stage.

(c) Next, the molding portion was evacuated by a vacuum pump 29 through a reduced-pressure suction tube 27 and a vacuum trap 28 communicated with the suction port 17. The degree of vacuum of the inside reached to approximately 0.8 kPa.

(d) Subsequently, the entire molding die 20 including a mold base 31 was heated by hot air supplied by a hot-air generator 33 (in order to quickly increase a temperature, the temperature of the hot air was initially set to 150° C. and was then changed to 80° C.). The periphery of the molding die 20 was covered with a heat insulating board having a high heat insulating effect and a heat insulating box 32 which supported the board mentioned above and was formed of a small steel tube-made support body. In order to effectively use the heat amount of the hot air generated by the hot-air generator 33 and supplied into the heat insulating box 32, the structure was made such that the hot air discharged from an exhaust 34 of the heat insulating box 32 was returned to the hot-air generator 33 (circulation of hot air) through a heat insulated exhaust duct (not shown).

(e) Next, when the temperature Tv of the bagging material monitored by a thermo couple 14a and a thermometer 15a reached 80° C., and the temperature Tm of the molding die monitored by a thermo couple 14b and a thermometer 15b reached 75° C. (that is, the ΔT was 5° C.), a valve 26a was opened, thereby starting the injection of an epoxy resin 24a stored in a resin bath by an atmospheric pressure, which resin was already defoamed after a base resin and a curing agent were mixed together and which was ready to be injected. However, since the resin 24a is disposed at a position higher than that of the molding die 20, exactly saying, the injection was performed by a pressure higher than an atmospheric pressure. The thermo couple 14b was disposed inside the molding portion at a distance of 3 mm from the surface of the molding die. The initial viscosity of this resin at 80° C. was 70 mPa·s, the initial viscosity at 75° C. was 100 mPa·s, and the difference was 30 mPa·s.

The resin 24a gradually impregnated the reinforcing fiber base materials while flowing from the resin injection 25 port 16a toward the suction port 17 through the groves 13 formed in the core material, and the flow velocity of the resin 24 significantly decreased when reaching another resin injection port 16b. Accordingly, almost at the same time when the valve 26a at the resin injection port 16a side was closed, a valve 26b was opened, thereby starting the injection of a resin 24b from the resin injection port 16b. The resin 24b flowing from the resin injection port 16b finally reached a vacuum suction tube 27 through a suction port 17. After the flow of the resin was confirmed, the valve 26b at the resin injection port 16b side was also closed, thereby stopping the resin injection. In the step described above, a resin detection sensor disposed at the resin injection port 16a side at a distance of 50 mm from the resin injection port 16b detected that the resin reached the resin injection port 16b.

(f) Subsequently, while the evacuation was continued by the vacuum pump 29 through the suction port 17, the resin impregnated in the reinforcing fiber base materials was cured by adjusting the temperature of hot air so that the temperature Tpc of the molding die was maintained at approximately 130° C. for approximately 3 hours.

(g) After it was confirmed that the resin was cured enough so as to be removed from the mold, auxiliary materials such as the various tubes, the bagging material, 25 and the like were removed, and the FRP molded body was then recovered from the molding die.

When the FRP molded body was inspected, no pinholes and no voids could be detected, and hence it was confirmed that significantly superior molding was performed. The reinforcing fiber volume ratio Vf of the reinforcing fiber member of the skin structure in the FRP molded body was 48%.

Comparative Example 1

Molding was performed in the same manner as that in the example except that, in the (e) described above, when the temperature Tv of the bagging material reached 80° C., and the temperature Tm of the molding die was 60° C. (that is, the ΔT was 20° C.), the injection of resin was started.

When the FRP molded body was inspected, several non-impregnated portions and voids were generated, the quality was poor, and as a result, it was confirmed that the molding was not performed well.

Example 2

Figure 4:
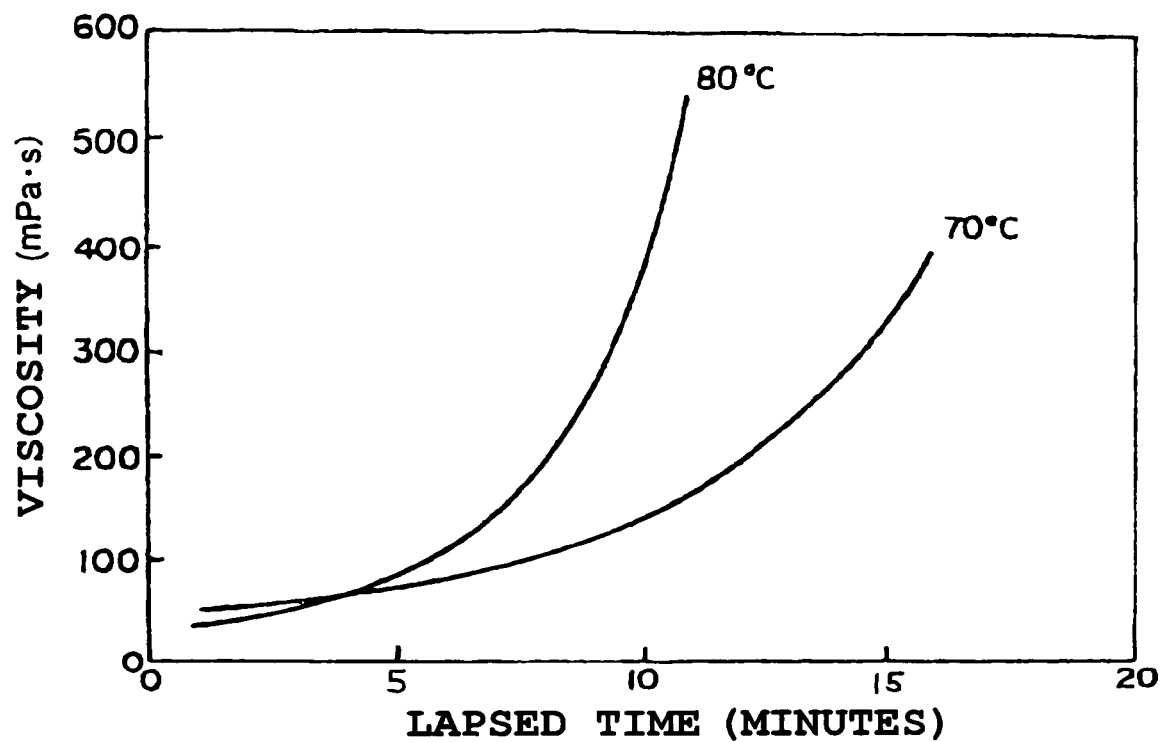
FIG. 4 is a view showing the viscosity characteristics of an epoxy resin used in examples 2 and 3 of the invention.

The molding die 1 shown in FIG. 2 was a FRP-made die 21 m long and 2.5 m wide. Although not shown in this figure, the entire die was placed in a simple molding chamber (a length of 25 m, a width of 3.5 m, and a height of 2 m), and the entire periphery thereof was formed of a heat insulating material and was ready to be heated by hot air generated by a hot-air generator provided outside the molding chamber. The hot air was circulated through a predetermined path. The reinforcing fiber base material used in this example was a carbon fiber plain woven fabric "Torayca" T700 (200 g/m² in fiber a real weight) manufactured by Toray Industries, Inc., and 16 plies thereof were totally disposed. In addition, the resin was a polyamine curable epoxy resin: TR-C32, manufactured by Toray Industries, Inc., and FIG. 4 is a graph showing the change in viscosity at 70 and 80° C. measured by an E type viscometer: TVE-30 model, manufactured by Toki Sangyo Co., LTD.

On the reinforcing fiber base material 2, a polyethylene-made mesh woven fabric (#200 mesh), the resin flow resistance of which being one tenth or less of that of the reinforcing fiber base material, was disposed as the resin distribution medium with a nylon-made release woven fabric provided therebetween. At predetermined positions on the mesh woven fabric, the resin detection sensors were fixed. Furthermore, the entire of the base material and auxiliary materials was covered with the bagging film. The sealing between this bagging film and the surface of the molding die was performed by using a sealing tape made of a synthetic rubber and having high adhesive properties.

As shown in FIG. 2, the resin injection lines were provided at four locations at regular intervals of 5 m. The resin detection sensors detecting the flow of the resin were each disposed at a position at a distance of approximately 100 mm from each of the resin injection lines. In order to decrease the error of the detection of the resin flow in the width direction, the two sensors were provided in the width direction at the location of the corresponding resin injection line.

The resin detection sensor used in this example was a plastic-made optical fiber sensor disclosed in Japanese Unexamined Patent Application Publication No. 2001-27678. In the sensor, a first optical fiber and a second optical fiber are disposed adjacent to each other, an emitting surface of the first optical fiber and an incident surface of the second optical fiber are each inclined, and the inclined surfaces oppose each other, whereby the sensor can determine whether liquid is present or not.

These optical fibers are bonded to each other by melting the coating thereof to form a cocoon shape having a double core structure. Alternatively, two single core optical fibers may be disposed side by side by adhering the fibers to each other with an adhesive. In addition, two single core optical fibers may be disposed in parallel without adhering to each other; however, in this case, the fibers must be formed so that the front edges thereof are not rotated.

By detecting the presence of a liquid substance from the change in emitted light or scattered light at the front edges of the adjacent two optical fibers, fixing tools for the optical fibers and swelling agent are not necessary, and hence the tools will never interfere with the flow of the liquid substance.

Figure 5:
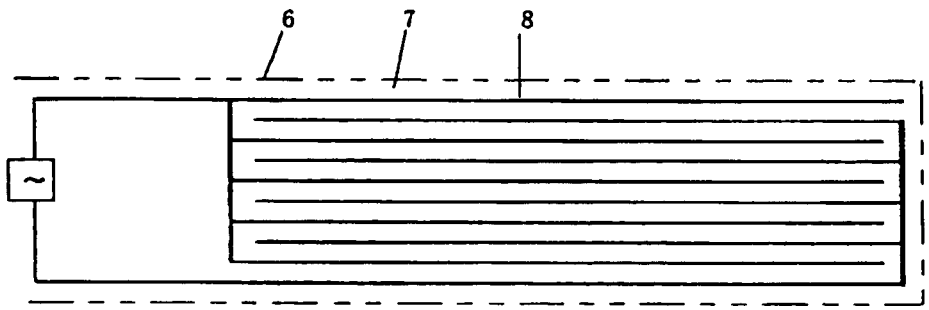
FIG. 5 is a schematic structural view of a dielectric sensor used in example 2 of the invention.

As the resin detection sensor, in addition to the optical fiber, various sensors may be used, and as one of the various sensors, a dielectric sensor 30 shown in FIG. 5 may also be used. This sensor is composed of a flexible base substrate 7 (for example, a polyimide-made thin film having a thickness of 0.2 to 0.4 mm) and two comb circuits 8 opposing each other provided on the substrate, and the comb circuits are formed of a conductive silver paste (DOTITE). When a resin flows in the circuit and impregnates it, the electrostatic coefficient (electrostatic capacity) changes in accordance with the impregnated area, and hence the position at which the resin impregnates can be detected.

After the bagging was completed, the entirety of the molding die was covered with a heat insulating box (not shown in the figure) formed of heat insulating panels, and hot-air circulation was then performed in which hot air at a temperature of 80° C. was supplied by the hot-air generator into the heat insulating box from one side thereof in the longitudinal direction and was then returned to the hot-air generator after being exhausted at the other side. At the same time, the evacuation of the inside of the cavity, which was bagged, from the vacuum suction line B was started, and before the molding temperature reached 80° C., the pressure was decreased to 1.3 kPa (10 Torr) or less.

Next, the resin injection was started when the molding die temperature Tm reached approximately 80° C. The temperature Tv of the bagging material at this moment was also approximately 80° C. That is, the ΔT was substantially 0° C. First, the valve D1 provided for the tube communicating the first resin injection line A1 was opened, so that the resin was injected to the first resin injection line A1 from the resin container E1 by a vacuum pressure. While flowing in the resin distribution medium having a low flow resistance, the injected resin impregnated the base material. However, when the resin flow became closer to the second resin injection line, the flow velocity decreased nonlinearly. The reason for this is that the flow resistance is gradually increased since the resin flowed so as to push or pass the resin already impregnated in the resin distribution medium.

When the gelation time of the resin is taken into consideration, the time for the resin to flow at a high temperature is limited. Accordingly, it is necessary that the injection of the resin whose velocity is considerably decreased be stopped, and that the resin be newly injected from a position at which the flow resistance is low. Positions, which are determined by the consideration of positions and time limitation, are positions for the second and subsequent resin injection lines.

Consequently, when the resin injected from the first resin injection line A1 reached the second resin injection line A2, the valve D2 was opened, thereby starting the injection of the resin from the second resin injection line A2. In this step, the arrival of the resin injected from the first resin injection line A1 at the second resin injection line A2 was confirmed by the resin detection sensor C2 disposed at a distance of approximately 100 mm behind the second resin injection line A2. The position at which the resin detection sensor is provided is preferably in the vicinity of a position passing through a new resin injection position; however, when the sensor is disposed just before the new resin injection position (for example, 50 to 100 mm ahead thereof), problems hardly occur.

The resin injected from the second resin injection line A2 finally reached the third resin injection line A3, and subsequent steps were the same as those described for the second resin injection line A2. When the resin injected from a fourth resin injection line A4 finally reached the vacuum suction line B provided at the endmost part, the resin injection from the fourth resin injection line A4 was also stopped.

Subsequently, the vacuum suction was continued for approximately 30 minutes, and a valve D5 at the suction portion was then closed. When a thermosetting resin containing a volatile solvent is used, after the entire area is impregnated with the resin, vacuum suction is preferably continued in order to prevent the generation of voids.

In this example, the initial viscosity of the resin at 80° C. was 35 mPa·s, and the difference was substantially 0 mPa·s.

Example 3

As another example of the present invention, an example of molding using a two-sided mold 40, according to the present invention, will be described with reference to FIG. 6 (vertical cross-sectional view of a mold), in this molding the flow of the resin cannot be observed at all.

Figure 6:
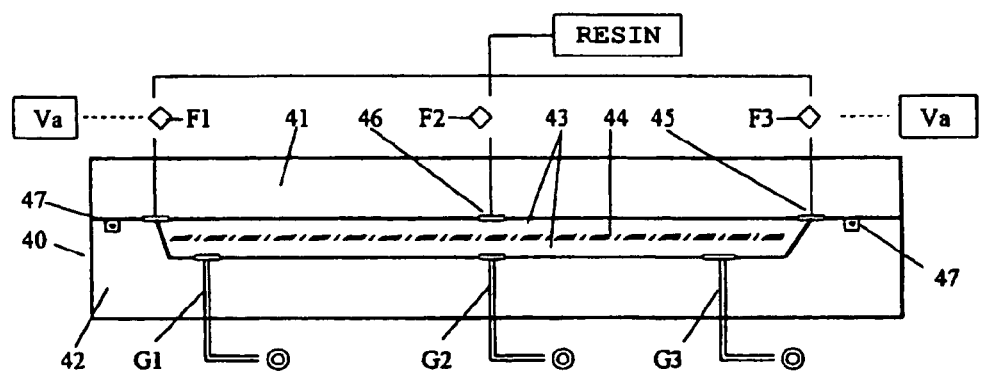
FIG. 6 is a schematic structural view showing a molding method according to example 3 of the invention.

As shown in FIG. 6, a foam core 44 wounded with a reinforcing fiber base material 43 ("Torayca" T300×200 g/m² in fiber areal weight, plain woven fabric, two plies, manufactured by Toray Industries, Inc.) was placed in a cavity formed in the center of the bottom mold 42 with a metal-made top mold 41. The foam core was made of a heat stable rigid polyurethane (an expansion rate of 20 times, the size having a thickness of 12 mm, a length of 2.5 m, and a width of 1.2 m) and had small groves (a width of 1.5 mm, a depth of 2.5 mm, and a pitch of 15 mm) in two major surfaces and side surfaces in the longitudinal direction as resin flow paths. In addition, in the center of the upper surface, a wide groove (a width of 4 mm and a depth of 4 mm) was linearly formed in the width direction so as to be communicated with the grooves in the longitudinal direction.

As resin injection ports, one resin injection port 46 was provided at a central portion of the top mold 41, and grooves 45 linearly extending in the width direction thereof were provided at two sides of the top mold 41 in the longitudinal direction. However, the grooves linearly extending in the width direction were also used as the initial vacuum suction lines.

As the resin detection sensors, dielectric sensors 6 were provided at three locations, that is, a central portion and two end portions on the surface of the bottom mold 42.

The resin used in this example was, as in example 2, a polyamine curable epoxy resin, TR-C32, manufactured by Toray Industries, Inc.

A mold 40 including the top and the bottom molds was heated to 70° C., and vacuum suction was then started from the vacuum suction lines 45 provided at the two sides. When the degree of vacuum was lower than 6.5 kPa (5 torr), the vacuum suction lines 45 were closed, and the injection of the resin was started from the central resin injection port 46. The injection of the resin was performed at a relatively low injection pressure of 196 kPa (2 kg/cm²) so that the base material was not disordered by a dynamic pressure of the resin. The resin thus injected flowed into the groove, which was provided in the width direction and at the center of the upper surface of the core 44, through the base material 43 and then moved to the two ends while flowing in the small grooves in the longitudinal direction. While flowing in the small grooves, the resin also impregnated the base material.

The resin then made a turn at the two ends and then flowed at the lower surface side. When induction sensors (G1 and G3) provided in the vicinities of the two ends at the lower surface side detected the resin reaching the lower surface, the injection of the resin was started from the resin injection lines 45 at the two sides. Subsequently, when the resin that reached the central portion of the lower surface side was detected, the pressure of the resin injected from the resin injection lines 45 at the two sides was increased to 490 kPa (5 kg/cm²) and was maintained until the resin was cured. As described above, when the resin is cured while a relatively high pressure is being applied, defects such as pinholes and voids at the surface side are solved since destroyed by a pressure thus applied, shrinkage caused by curing contraction of the resin can be suppressed, and as a result, a surface having a good appearance can be obtained.

In this example, the initial viscosity of the resin at 70° C. was 55 mPa·s, and the difference was substantially 0 mPa·s.

In addition, after the resin injection is completed, the monitoring of a curing step can also be performed by the dielectric sensor. In particular, the difference in time for curing among the two end portions and the central portion can be grasped in detail.

Example 4

(1) Structure: a planar plate having a length of 5 m and a width of 3 m (assuming a primary structural member of aircrafts (for example, a skin plate of a main wing or a tail unit))

(2) Reinforcing fiber base material: unidirectional woven fabric, the entirety of one of surfaces being coated with adhesive particles warp yarn: "Torayca" manufactured by Toray Industries, Inc., having a tensile strength of 5,830 MPa, a tensile modulus of 294 GPa, a destructive stress energy of 58 Mi/m³, Tex=1,030,2.8 yarns/cm, and a carbon fiber areal weight of 295 g/m² weft yarn: Glass Yarn ECE225 1/0 1.OZ DP binder, 3 years/cm, manufactured by Nitto Boseki Co., Ltd.

adhesive particles: a thermoplastic resin as a primary component having a glass transition temperature of 40° C., and an amount of particles of 40 g/m²

(3) Quasisotropic laminate $[-45/0/45/90]_{3S}$ (4) Resin distribution medium: aluminum-made mesh (16 mesh, and an opening of 1.4 mm)

(5) Molding die: stainless steel-made plain plate having a thickness of 2 mm.

The FRP molded body described above was molded by the following method.

(a) After reinforcing fiber base materials were cut to have a predetermined size and shape and were then laminated to each other on the surface of the molding die. On the surface of the laminate formed of the reinforcing fiber base materials, a peel ply, the resin distribution medium, a compression plate (2 mm thick) made of aluminum were disposed in that order, and thereafter a plurality of resin injection lines and suction lines were formed. The layout of the resin injection lines and the suction lines was the same as shown in FIG. 3.

(b) The entire molding portion was sealed as in example 1.

(c) The molding portion was evacuated so that the degree of vacuum of the inside was set to 0.8 kPa as in example 1.

(d) Subsequently, as in example 1, the entire molding die was heated by hot air to 70° C. and was then maintained for 1 hour. By applying a pressure while heating was performed as described above, the reinforcing fiber base materials laminated to each other with the adhesive particles were bonded to each other in the thickness direction, thereby forming a preform. The reinforcing fiber volume ratio Vpf in this preform was 49%.

(e) When the temperature Tv of the bagging material monitored by a thermo couple reached 70° C., and the temperature Tm of the molding die was 67° C. (that is, the ΔT was 3° C.), an epoxy resin stored in a resin bath, which resin was already defoamed after a base resin and a curing agent were mixed together and which was ready to be injected, was injected. The viscosity of this resin at 70° C. was 130 mPa·s, the viscosity at 68° C. was 175 mPa·s, and the difference was 45 mPa·s. The resin was disposed at a position lower than that of the molding die, and exactly saying, injection was performed at a pressure lower than an atmospheric pressure. The thermo couples were disposed on the rear surface of the molding die and the exterior surface of the bagging material.

As in example 1, the resin was injected from a first resin injection port through the resin distribution medium. After the resin injected from the first resin injection port almost reached the second resin injection port, the injection from the first resin injection port was stopped, and at the same time, the resin was injected from the second resin injection port. In addition, after the resin reached the suction port, the resin injection was stopped.

(f) Subsequently, while evacuation is continued through the suction port, the temperature of the molding die was increased from the Tm (75° C.) at a rate of 1.5° C./min so as to reach the Tpc (130° C.), which was the curing temperature, and was maintained at 130° C. for 2 hours, thereby curing the resin thus impregnated in the reinforcing fiber base materials. The reinforcing fiber volume ratio Vf in the FRP at this stage was 53%.

(g) The temperature of the molding die was decreased to room temperature at a rate of 2.5° C./min, the auxiliary materials, such as the peel ply, resin distribution medium, tubes, bagging material, were removed, and the FRP molded body was then recovered from the molding die. The glass transition temperature of the resin at this stage was 134° C.

(h) By using a different hot-air generator and heat insulating box, the FRP thus demolded was heated to a full curing temperature Tac (180° C.) at a rate of 1.5° C./min from room temperature and was held at 180° C. for 2 hours, thereby further curing the resin.

(i) Subsequently, the temperature was decreased at a rate of 2.5° C./min to room temperature. The glass transition temperature of the resin at this stage was 176° C.

When the FRP molded body was inspected, pinholes and voids could not be observed at any place, and it was confirmed that significantly superior molding was performed.

The results of the examples and comparative example are collectively shown in Table 1 below.

As described above, in the case in which a plurality of the resin injection ports or lines is provided, even when the flow condition of the resin cannot be visually inspected, by using the resin detection sensors disposed at the important positions, the flow of the resin can be precisely understood at each important position, and hence timing of injecting the resin from the resin injection ports can be appropriately determined. Consequently, without non-impregnated portions or voids, a high quality FRP molded body can be obtained. The molding method described above is suitably used for manufacturing relatively large molded bodies such as outer plate members or primary structural materials of automobiles; primary structural materials (fuselages, main wings, or tail units) or secondary structural materials (fairings or control surfaces) of aircrafts; wing-shape members (wing bodies of wind mills); or railroad vehicles.

TABLE 1

|  | EXAMPLE 1 | COMPARATIVE EXAMPLE 1 | EXAMPLE 2 | EXAMPLE 3 | EXAMPLE 4 |
|---|---|---|---|---|---|
| Size of Molded Body (m × m) |  | 5 × 3 | 21 × 2.5 | 2.5 × 1.2 | 5 × 3 |
| Temperature Tm of Molding Die | 75° C. | 60° C. | 80° C. | 70° C. | 70° C. |
| Temperature Tv of Bagging Material |  | 80° C. | 80° C. | 70° C. | 67° C. |
| Difference ΔT between Tm and Tv | 5° C. | 20° C. | 0° C. | 0° C. | 3° C. |
| Curing Temperature Tpc |  | Approximately 130° C. | 80° C. | 70° C. | 130° C. |
| Heating Method |  | Circulation of Hot Air |  | Mold | Circulation of Hot Air |
| Molding Chamber |  | Simple Sealed Chamber Made of Heat Insulating Material |  | — | Simple Sealed Chamber Made of Heat Insulating Material |
| Resin Distribution Medium |  | Core Material Having Rectangular Grooves (3 mm wide, 3 mm deep, and 25 mm in pitch) | Mesh Woven Fabric | Foam Core Having Small Grooves in Two Major Surfaces and Side Surfaces (1.5 mm wide, 2.5 mm deep, and 15 mm in pitch) | Aluminum-made Mesh |
| Viscosity ηp at Tm or Tv, Whichever is Lower | 100 mPa · s | 290 mPa · s | 35 mPa · s | 55 mPa · s | 175 mPa · s |
| Difference Δη between viscosities at Tm and at Tv | 30 mPa · s | 230 mPa · s | 0 mPa · s | 0 mPa · s | 45 mPa · s |
| Reinforcing Fiber |  | 48% | — | — | 49% |

TABLE 1-continued

| | EXAMPLE 1 | COMPARATIVE EXAMPLE 1 | EXAMPLE 2 | EXAMPLE 3 | EXAMPLE 4 |
|---|---|---|---|---|---|
| Volume Ratio Vpf in Preform | | | | | |
| Evacuation of Molding Portion through Suction Ports | FIG. 3 | | FIG. 2 | FIG. 6 | FIG. 3 |
| Control of Timing of Injection Start by Signals from Resin Detection Sensor | Injection Ports 16a → 16b | | Injection Lines A1 → A2 → A3 → A4 | Injection Ports 46 → 45 | Injection Ports 16a → 16b |
| Reinforcing Fiber Volume Ratio Vf in FRP | 48% | — | — | — | 53% |
| Quantity of Large FRP Member | No Pinholes and No Voids, Significantly Superior | Several Non-Impregnated Portions and Voids, Inferior Quality | No Pinholes and No Voids, Significantly Superior | | |

The invention claimed is:

1. A method for manufacturing a large FRP member comprising the following steps (A) to (F),
   the step (A) being a step of disposing a preform containing at least one reinforcing fiber base material on a surface of a molding die;
   the step (B) being a step of covering a molding portion with a bagging material or a mold and providing at least one suction port and at least one resin injection port for sealing;
   the step (C) being a step of evacuating the molding portion through the suction port;
   the step (D) being a step of heating the molding portion by placing the molding die in a sealed chamber which is heat insulated with a heat insulating material, and the entire molding portion is heated by supplying hot air;
   the step (E) being a step of injecting a thermosetting resin from the resin injection port for impregnating the reinforcing fiber base material with the resin while a temperature Tm of the molding die and a temperature Tv of the bagging material or the mold are both set to room temperature or more, and a difference $\Delta T$ in temperature therebetween is set to 10° C. or less;
   the step (F) being a step of curing the resin by maintaining the molding portion at a predetermined temperature Tpc which is equal to or more than room temperature.

2. The method according to claim 1, wherein, in the heating step (D), the hot air is supplied and circulated.

3. The method according to claim 1, wherein the preform comprises the reinforcing fiber base material and a resin distribution medium.

4. The method according to claim 3, wherein a sheet-shape resin distribution medium is used as the resin distribution medium.

5. The method according to claim 3, wherein the resin distribution medium comprises a net-shape sheet, and the net-shape sheet is removed from a FRP after the curing step (F).

6. The method according to claim 3, wherein the resin distribution medium comprises a core material provided with resin flow grooves, and the core material is allowed to remain in a FRP after the curing step (F).

7. The method according to claim 1, wherein the temperature Tm of the molding die or the temperature Tv of the bagging material or the mold is in the range of from 50 to 160° C., and the predetermined temperature Tpc of the molding portion is in the range of from 80 to 180° C. in the curing step (F).

8. The method according to claim 1, further comprising the following steps (G) and (H) after the curing step (F),
   the step (G) being a step of recovering a FRP,
   the step (H) being a step of fully curing the resin by maintaining the recovered FRP at a predetermined temperature Tac which is higher than the predetermined temperature Tpc of the molding portion and which is 100° C. or more.

9. The method according to claim 1, wherein a resin having a glass transition temperature of 120° C. or more after curing is used as the thermosetting resin.

10. The method according to claim 9, wherein a viscosity $\eta p$ at the temperature Tm of the molding die or the temperature Tv of the bagging material or the mold, whichever is lower, is 500 mPa·s or less, and a difference $\Delta \eta$ between the viscosity at the Tm and the viscosity at the Tv is 200 mPa·s or less.

11. The method according to claim 1, wherein the molding portion is evacuated through a plurality of the suction ports, and the resin is injected from a plurality of the resin injection ports.

12. The method according to claim 11, wherein timing of starting the injection of the resin from said plurality of the resin injection ports is staggered.

13. The method according to claim 11, wherein timing of starting the injection of the resin from said plurality of the resin injection ports is controlled in accordance with signals supplied from a resin detection sensor provided in the molding die.

14. The method according to claim 13, wherein the resin detection sensor is a detection sensor comprising a first optical fiber having an emitting surface at the vicinity of a front edge thereof for emitting light, and a second optical fiber having an incident surface at the vicinity of a front edge thereof for receiving the emitted light.

15. The method according to claim 13, wherein the resin detection sensor is a detection sensor comprising a flexible dielectric circuit substrate which detects the change in dielectric constant.

16. The method according to claim 1, wherein, in the resin injection step (E), a reinforcing fiber volume ratio Vpf of the reinforcing fiber base material in the preform is set to 45% to 62%, and the thermosetting resin is injected.

17. The method according to claim 1, wherein a reinforcing fiber volume ratio Vf of the reinforcing fiber base material in the large FRP member is set to 45% to 65% in the curing step (F).

18. The method according to claim 1, wherein the reinforcing fiber base material is a reinforcing fiber base material comprising carbon fibers.

19. The method according to claim 1, wherein the reinforcing fiber base material is a reinforcing fiber base material comprising a carbon fiber woven fabric.

20. The method according to claim 1, wherein a plurality of the reinforcing fiber base materials is laminated to each other and disposed.

21. The method according to claim 18, wherein parts of the reinforcing fiber base materials are fixed to each other.

22. The method according to claim 1, wherein a resin bath is disposed at a position higher than that of the surface of the molding die in the resin injection step (E).

23. The method according to claim 1, wherein the evacuation is continued from the suction port in the resin injection step (E) until the injected resin is gelled.

24. The method according to claim 1, wherein a FRP having a maximum length of 3 m or more is molded.

25. The method according to claim 1, wherein the large FRP member is a primary structural member, a secondary structural member, an exterior member, an internal member, or a component thereof for transport facilities of aircrafts, automobiles, railroad vehicles, or ships and vessels.

26. The method according to claim 23, wherein the primary structural member is a fuselage, a main wing, or a component thereof of an aircraft.

27. The method according to claim 24, wherein the primary structural member is a CFRP-made skin-stringer structural member for a fuselage or a main wing of an aircraft.

* * * * *

UNITED STATES PATENT AND TRADEMARK OFFICE
CERTIFICATE OF CORRECTION

| | | |
|---|---|---|
| PATENT NO. | : 7,081,218 B2 | Page 1 of 1 |
| APPLICATION NO. | : 10/398147 | |
| DATED | : July 25, 2006 | |
| INVENTOR(S) | : Sekido et al. | |

It is certified that error appears in the above-identified patent and that said Letters Patent is hereby corrected as shown below:

<u>On the Title Page</u>
Item (30) Add, Foreign Application Priority Data --JAPAN 2001-243603 08/10/2001-- and --JAPAN 2001-249055 08/20/2001--.

Signed and Sealed this

Thirteenth Day of February, 2007

JON W. DUDAS
*Director of the United States Patent and Trademark Office*